(12) United States Patent
Matsubara et al.

(10) Patent No.: US 6,256,860 B1
(45) Date of Patent: Jul. 10, 2001

(54) PROCESS FOR FABRICATING A MAGNETIC DISK SUBSTRATE

(75) Inventors: Hiromichi Matsubara; Shoichiro Kanouchi, both of Tochigi-ken (JP)

(73) Assignee: Showa Denko K. K., Tokyo (JP)

( * ) Notice: Subject to any disclaimer, the term of this patent is extended or adjusted under 35 U.S.C. 154(b) by 0 days.

(21) Appl. No.: 09/073,545

(22) Filed: May 6, 1998

(30) Foreign Application Priority Data

May 28, 1997 (JP) .................................................... 9-154429

(51) Int. Cl.$^7$ ........................................................ B23P 13/02
(52) U.S. Cl. ................................................ 29/558; 451/54
(58) Field of Search ........................ 29/557, 558, 603.16; 451/54, 57

(56) References Cited

U.S. PATENT DOCUMENTS

| | | | |
|---|---|---|---|
| 1,949,515 | * | 3/1934 | Norton . |
| 3,218,763 | * | 11/1965 | Kikuchi et al. . |
| 3,528,665 | * | 9/1970 | Redlich . |
| 3,763,602 | * | 10/1973 | Boettcher . |
| 3,801,293 | * | 4/1974 | Kiser . |
| 3,888,050 | * | 6/1975 | Elm . |
| 4,445,300 | * | 5/1984 | Sekiya et al. . |
| 4,517,772 | * | 5/1985 | Elliott . |
| 4,586,296 | * | 5/1986 | Saunders . |
| 4,640,651 | * | 2/1987 | Runyon . |
| 4,724,599 | * | 2/1988 | Corkin . |
| 5,136,819 | * | 8/1992 | Takagi et al. . |
| 5,202,810 | * | 4/1993 | Nakamura et al. . |
| 5,342,067 | * | 8/1994 | Adler et al. . |
| 5,413,850 | * | 5/1995 | Nehring . |
| 5,482,497 | * | 1/1996 | Gonnella et al. . |
| 5,749,769 | * | 5/1998 | Church et al. . |

FOREIGN PATENT DOCUMENTS

| | | |
|---|---|---|
| 3-141023 | 6/1991 | (JP) . |
| 07262554 | 10/1995 | (JP) . |

* cited by examiner

Primary Examiner—S. Thomas Hughes
(74) Attorney, Agent, or Firm—Flynn, Thiel, Boutell & Tanis, P.C.

(57) ABSTRACT

It is an object of the present invention to provide a magnetic hard disk substrate having an excellent surface flatness. According to the present invention, there is provided the magnetic hard disk substrate and a process of fabricating the substrate in which an aluminum alloy blank, before an Ni-P plating treatment, is subjected to precision turning, with a stock removal on each surface in the range of 20 to 150 $\mu$m in depth, followed by grinding, with a stock removal on each surface of 10 $\mu$m or less in depth.

8 Claims, 1 Drawing Sheet

PROCESS FOR FABRICATING A MAGNETIC DISK SUBSTRATE

BACKGROUND OF THE INVENTION a) Field of the Invention

The present invention relates to a process of fabricating a magnetic hard disk substrate having an excellent surface flatness.

b) Description of the Prior Art

There has been a general trend toward a higher density and larger capacity of a magnetic hard disk device as a storage device of a computer and the like and it has, therefore, been an important technical aspect to finish a magnetic hard disk substrate used for the device to a desired surface roughness and flatness. Particularly, there has been achieved a conspicuous development in the reduction of levitation based on an improvement in the head side part for the realization of a high density recording and thereby, the gap between a head and a medium has been narrowed and in company with this, further improvement in not only the surface flatness of a magnetic hard disk substrate but also the surface roughness thereof has strongly been demanded in order to prevent a head crash.

It is common that a magnetic hard disk substrate is fabricated by a process comprising the steps of: obtaining a blank by blanking a rolled coil of aluminum or aluminum alloy (hereinafter referred to as simply aluminum); grinding a surface of the blank so as to have surface damage, waviness and the like removed to attain a substrate; effecting Ni-P plating on the surface; performing finish polishing on the plated surface; thereafter performing magnetic sputtering on the polished surface to form a magnetic coating layer; and applying an overcoat on the layer to obtain a sputtering medium. In order to control the surface roughness and flatness within a predetermined range in the process, in the grinding step applied prior to the Ni-P plating step, the magnetic hard disk substrate (as a blank) is subjected to rough grinding by a grinding stone with a grain size of the order of #800 in a double-surface grinding machine, which is followed by finish grinding by a grinding stone with a grain size of the order of #3000 in the grinding machine. This kind of grinding is called a G—G (Grinding-Grinding) process, for this grinding step comprises two sub-steps of grinding.

In a conventional G—G process, however, since a first step of rough grinding has been applied on plural Aluminum blanks in one operation by a grinding stone or the like, the removal of stock by grinding is limited and a stock removal large enough to effect grinding off a bow, waviness or the like has been hard to achieve. Therefore, in a second step of grinding, which is performed following the rough grinding in a similar way thereto, the removal of stock is obliged to be larger, even with which it is still difficult to reduce the substrate-to-substrate thickness variation. Instead of the G—G process, there is also a well-known process, which is a so-called T-G process, in which in a first step, turning is performed and in a second step, grinding is performed. According to the T-G process, as a first step, turning by use of a precision lathe is performed and as a second step following the first step, grinding is performed, so that while a bow, waviness and the like of a magnetic hard disk substrate are eliminated, the magnitude of a grinding stress is dispersed by an uneven stock removal, which is, in turn, caused by a substrate-to-substrate thickness variation, and a deteriorated surface flatness of the substrate results, which have been causes for making severe requirements for a magnetic hard disk substrate difficult to satisfy.

SUMMARY OF THE INVENTION

It is an object of the present invention to provide a magnetic hard disk substrate having an excellent surface flatness and a process of fabricating the same.

The present invention has been made based on the finding that an aluminum magnetic hard disk substrate is prevented from deteriorating in surface flatness and can satisfy severe requirements therefor by application of the process steps of removing the stock of a blank by a depth in the range of 20 to 150 $\mu$m by precision turning with an NC automatic lathe to adjust the thickness of a substrate; and further removing the stock off the blank by a depth of 10 $\mu$m or less by grinding. That is, according to the present invention, there is provided an aluminum magnetic hard disk substrate and a process of fabricating the aluminum magnetic hard disk substrate in which an aluminum alloy blank, before an Ni-P plating treatment, is subjected to precision turning with stock removal on each surface in the range of 20 to 150 $\mu$m in depth, which is followed by grinding with stock removal on each surface of 10 $\mu$m or less in depth.

The precision turning is preferably performed in a way in which both surfaces of a blank are machined in a uniform manner, the rotational speed of a main spindle of an NC automatic lathe is set at a value in the range of 500 to 10000 rpm, or preferably in the range of 3000 to 6000 rpm and the feed rate of a diamond tool is set at a value in the range of 0.010 to 0.500 mm/rev., or preferably in the range of 0.05 to 0.20 mm/rev. The grinding is preferably performed on two or more blanks simultaneously and the spread of the thickness distribution of the blanks to be ground in one batch is prepared at a value of 10 $\mu$m or less, or preferably 5 $\mu$m or less.

Other objects and features of the present invention will become obvious from the following description or the recitation in the appended claims.

DESCRIPTION OF THE PREFERRED EMBODIMENTS

Figure 1:
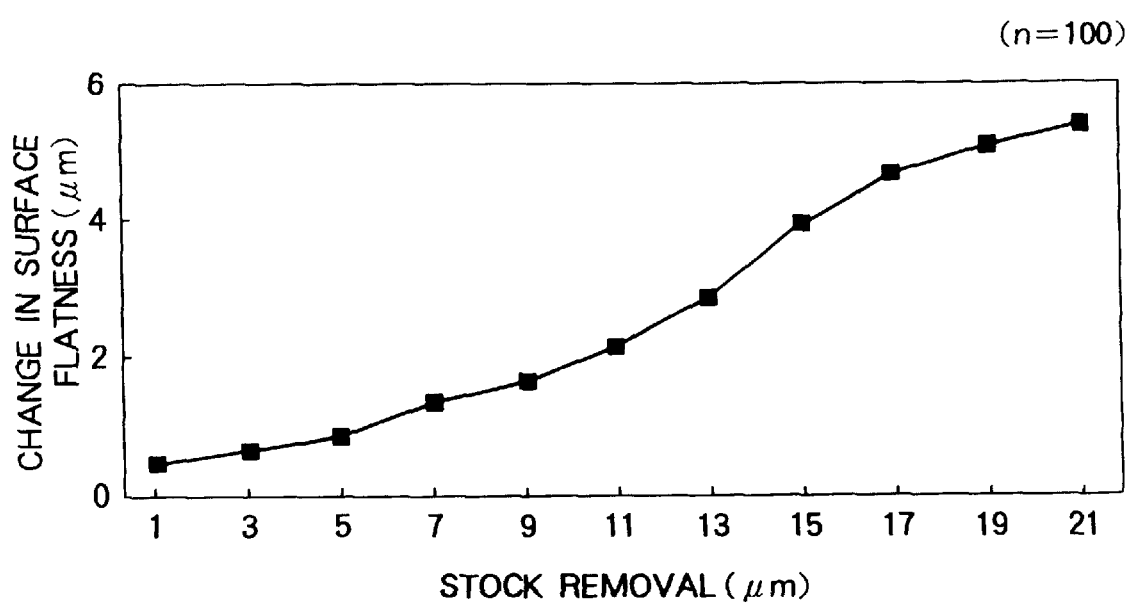
FIG. 1 is a graph showing the relationship between the change in surface flatness and stock removal in finish grinding.

The present invention will in a more detailed manner be described below. As mentioned above, the present invention has a feature that, for the purpose of improving the surface flatness after grinding, a blank is first subjected to precision turning by an NC automatic lathe and the blank is further subjected to grinding by a double-surface grinding machine after a heat treatment following the turning step. Each of the turning and grinding steps will be described below.

First of all, a doughnut-shaped aluminum blank, which is a starting raw material, is subjected to facing by an NC automatic lathe with a diamond tool and then subjected to chamfering, to finish the blank to a predetermined shape and dimensions. In this case, a double-surface uniform turning method proposed in Japanese Patent Laid-Open Publication No. 192336/1996, already filed by the same applicant as the present application, is employed in the facing step in order to not only prevent bowing of the substrate from occurring, which is produced due to a difference in stock removal between the first and second turning surfaces, but also suppresses the substrate-to-substrate variation in thickness to a predetermined value or less. In this double-surface uniform turning method, turning is conducted with a cutting depth in the range of 20 to 150 μm, preferably in the range of 50 to 150 μm on each surface. If the cutting depth is less than 20 μm, the depth is not sufficient to eliminate a bow, waviness and the like and, in addition, the turning resistance is larger. In order to not deteriorate the surface flatness of a substrate, turning is conducted under the following conditions, which are: the rotational speed of a main spindle of an NC automatic lathe is preferably set in the range of 500 to 10000 rpm or, more preferably, in the range of 3000 to 6000 rpm and the feed rate of a diamond tool is set in the range of 0.010 to 0.500 mm/rev., or preferably in the range of 0.05 to 0.20 mm/rev.

The substrate after the turning step is subjected to a heat treatment in a heating furnace in order to release the residual stress distributed in the substrate. With this heat treatment, not only can the substrate achieve a surface flatness equal to that of an aluminum blank, but the spread of the thickness distribution of the substrate can also be confined within +5 μm.

The blank after the heat treatment is subjected to grinding to effect a stock removal as small as a depth of 10 μm or less, preferably 5 μm or less, by a double-surface grinding machine. Grinding conditions in this grinding step are that the rotational speed of the top and bottom surface plates are set in the range of 10 to 60 rpm, the rotational speed of a sun gear is in the range of 1 to 3 rpm and the grinding pressure is in the range of 30 to 100 g/cm$^2$. If these grinding conditions are applied to each blank with precisely controlled dimensions and an excellent surface flatness, not only can the stock removal of the blanks be equal to each other but uniform grinding can also be realized, even when plural blanks are simultaneously ground. The relationship between the change in surface flatness in grinding (the surface flatness after grinding minus the original surface flatness of an aluminum alloy blank) and the stock removal is shown in FIG. 1. As seen from FIG. 1, the change in surface flatness can be 2 μm or less in the case where the stock removal by grinding is limited to 10 μm or less.

EXAMPLE

A doughnut-shaped aluminum alloy blank (A5086) was subjected to turning with a stock removal of 50 to 100 μm in depth for each surface in a uniform manner on both sides of the blank by an NC automatic lathe using a diamond tool according to a method described in Japanese Patent Laid-Open Publication No. 192336/1996 and as a result, the blank was finished to dimensions of an outer diameter of 95 mm, an inner diameter of 25 mm and a thickness of 0.8 mm. In this example, the turning conditions were set such that the rotational speed of the main spindle of the lathe was 5000 rpm and the feed rate of the diamond tool was 0.3 mm/rev. The blanks thus machined were ground in a batch composed of 15 pieces at one time. The maximum spread of blank-to-blank thickness variation in a batch of blanks to be ground was prepared within 10 μm or less. The blanks which had been subjected to the turning step were heated at 250° C. in a heating furnace for 60 min to remove the residual stress in the substrates and the substrates were subsequently subjected to grinding. The grinding conditions were set in such a manner that the rotational speed of the top and bottom surface plates was 30 rpm, the rotational speed of a sun gear was 2 rpm and the grinding pressure was 50 g and the grinding operation was conducted so as to remove stock of 5 μm in depth on each side. The change in surface flatness after the grinding operation was 1 μm and the surface was further treated by an ordinary process including Ni-P plating, finish polishing, magnetic sputtering, overcoating and the like to obtain a magnetic hard disk substrate. The obtained substrates had, in a practical sense, no variation in substrate-to-substrate thickness and each had an excellent surface flatness on the substrate as well. There is the case where a heat treatment is inserted between the steps of Ni-P plating and polishing in order to eliminate the strain in the substrate caused by the plating treatment.

According to the present invention mentioned above, a magnetic hard disk substrate having an excellent flatness can be obtained by a simple process and, besides, there can be obtained a magnetic hard disk substrate which can sufficiently be adapted for a narrower gap between the magnetic head and a medium, with reduced levitation of the head, accompanying the recent progress in high-density recording.

What is claimed is:

1. A process of fabricating a magnetic hard disk substrate comprising the steps of: providing a blank made of aluminum or an aluminum alloy and having two opposing surfaces to be finished; turning said blank with a lathe to effect the removal of from 20–150 μm in depth of stock from each of said surfaces; and grinding said blank to effect a stock removal of not more than 10 μm in depth from each of said surfaces.

2. A process according to claim 1, wherein the precision turning is performed in a way in a which both surfaces of the blank are simultaneously machined in uniform manner.

3. A process according to claim 2, wherein the turning step is performed step by an NC automatic lathe, a rotational speed of a main spindle thereof is set at a value in the range of 500 to 10000 rpm and a feed rate of a diamond tool is set at a value in the range of 0.010 to 0.500 mm/rev.

4. A process according to claim 3, wherein the rotational speed of a main spindle is set at a value in the range of 3000 to 6000 rpm and the feed rate of a diamond tool is set at a value in the range of 0.05 mm to 0.20 mm/rev.

5. A process according to claim 1, wherein the grinding is performed simultaneously on two or more substrates which have already been subjected to the turning step, and a spread of a substrate-to-substrate thickness distribution of which is prepared at a value of 10 μm or less for one batch.

6. A process according to claim 5, wherein the grinding is performed simultaneously on two or more substrates which have already been subjected to the turning step, and a spread of a substrate-to-substrate thickness distribution of which is controlled at a value of 5 μm or less for one batch.

7. A process according to claim 1, wherein the substrate, after the turning step, is subjected to a heat treatment in a heating furnace in order to release a residual stress distributed in the substrate before the grinding step.

8. A process according to claim 6, wherein conditions in the grinding step are such that a rotational speed of top and bottom surface plates are in the range of 10 to 60 rpm, a rotational speed of a sun gear is in the range of 1 to 3 rpm and a grinding pressure is in the range of 30 to 100 g/cm2 under control.

* * * * *